UNITED STATES PATENT OFFICE.

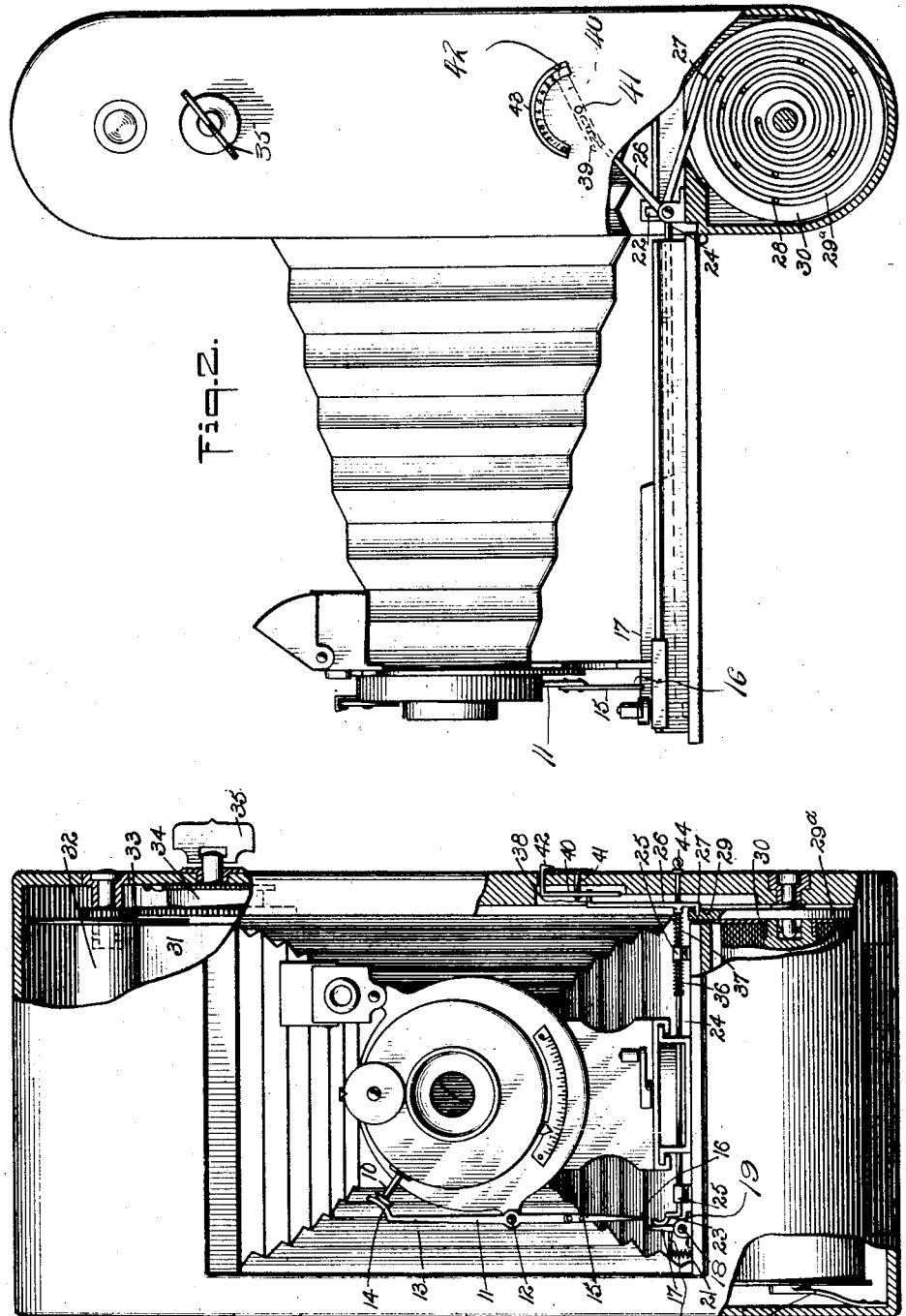

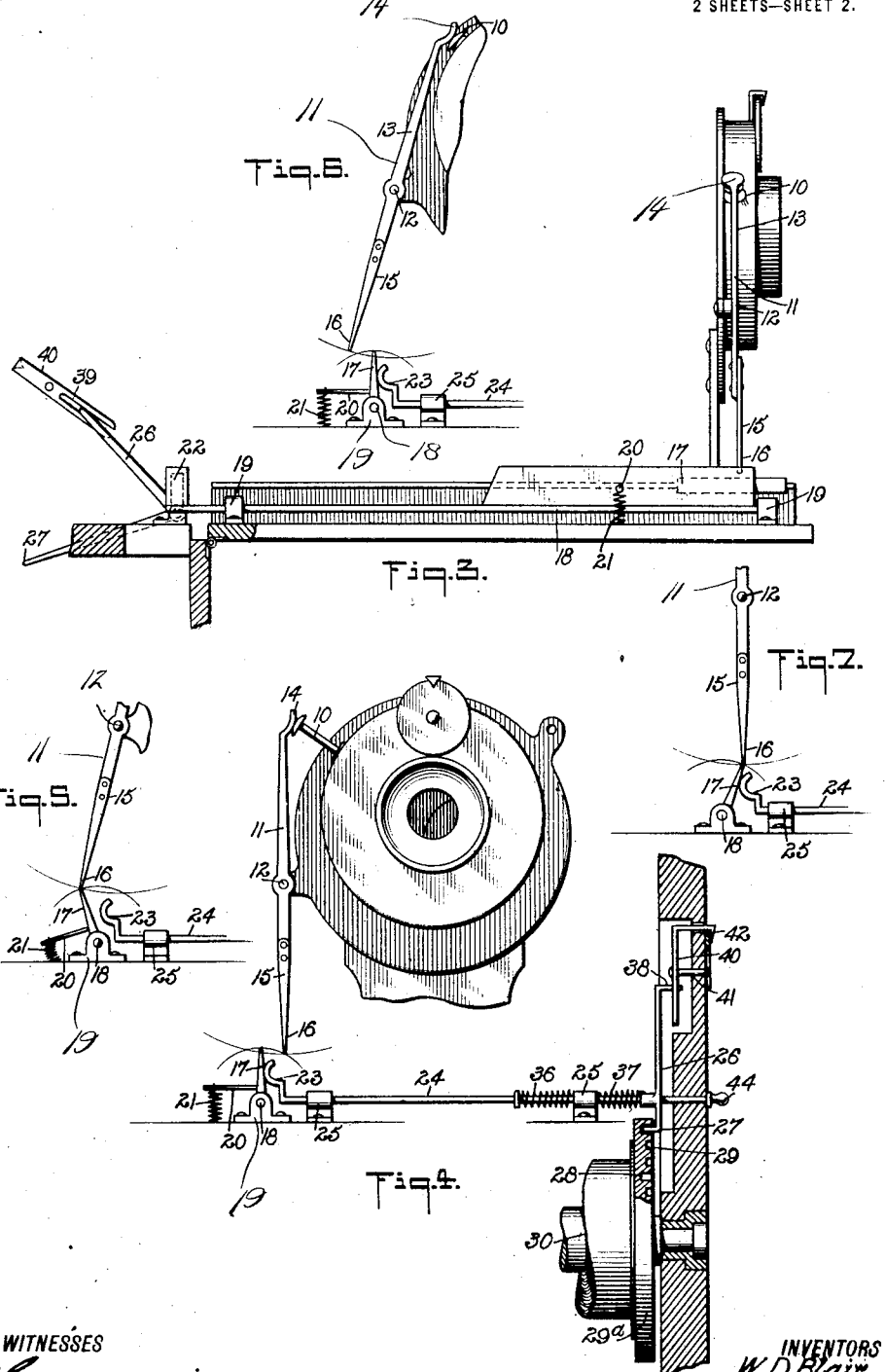

WILLIAM DORWARD BLAIR AND WILLIAM JOHN WRIGHT, OF MEDICINE HAT, ALBERTA, CANADA.

CAMERA.

1,246,531. Specification of Letters Patent. Patented Nov. 13, 1917.

Application filed February 27, 1917. Serial No. 151,366.

*To all whom it may concern:*

Be it known that we, WILLIAM DORWARD BLAIR and WILLIAM JOHN WRIGHT, both subjects of the King of Great Britain, and residents of Medicine Hat, Alta., Dominion of Canada, have invented a new and Improved Camera, of which the following is a ful, clear, and exact description.

Our invention has for its object to provide a camera which is constructed in a manner which will prevent the possibility of a double exposure, and which will automatically move a new film surface to operative position after each exposure.

Other objects of the invention are to provide a new means to indicate the number of exposures which have been made on the film, and to provide means for holding the film in position and under tension while making exposures.

Additional objects of the invention will appear in the following specification, in which the preferred form of the invention is disclosed.

In the drawings, similar reference characters denote similar parts in all the views, in which Figure 1 is a front elevation showing the camera, parts being broken away to illustrate the construction;

Fig. 2 is a side elevation of the camera parts being broken away to illustrate the construction;

Fig. 3 is a side elevational view illustrating the improvement;

Fig. 4 is a front elevation of Fig. 3, illustrating the operating mechanism at rest;

Fig. 5 is a fragmentary view illustrating the first movement of the operating mechanism;

Fig. 6 is a fragmentary view illustrating the positions of the parts at the end of the first movement of the operating mechanism; and Fig. 7 is another fragmentary view illustrating the position of the parts at the end of the return movement of the operating mechanism.

By referring to the drawings, it will be seen that the camera is provided with a shutter-operating plunger 10, and with a lever 11 pivoted at 12, an arm 13 of the lever having a terminal 14 disposed against the end of the plunger 10, so that when the terminal 14 of the lever 11 is pressed inwardly, it will operate the plunger 10 in a manner readily understood. The other arm 15 of the lever 11 is disposed downwardly with its terminal 16 adapted to engage and move an arm 17 which is secured to a shaft 18 disposed longitudinally of the camera and journaled in bearings 19. A finger 20 is secured to the arm 17, and this finger 20 is connected by a spring 21 with the body of the camera so that the arm 17 will be disposed normally in the position indicated in Fig. 1 of the drawings.

When the plunger 10 is operated by the terminal 14 of the lever 11, the lower arm 15 of the lever 11 will be moved to the position indicated in Fig. 5 of the drawings so that the terminal 16 of the arm 15 will move to the left of the arm 17, as indicated in Fig. 6 of the drawings, the arm 17 being returned to normal position by means of the spring 21. When the plunger 10 moves outwardly with the closing of the shutter, it will press the arm 13 of the lever 11 to the left, which will move the arm 15 of the lever to the right, as indicated in Fig. 7 of the drawings, and with this movement of the arm 17 to the right it will rotate the shaft so that an arm 22 which is secured to the shaft 18 will engage the end 23 of a plunger 24 disposed transversely of the camera and in bearings 25. This movement of the plunger 24 to the right by the means which have been described will move outwardly a lever 26 which is mounted on the plunger 24, and free a dog 27 on the lever 26 from one of the recesses 28 which are spaced apart in a spiral groove plate 29ª at the end of a film spool 30, and journaled in a bearing in the camera. A film 31 is wound on this film spool 30, and is disposed around another film spool 32, the film spool 32 being rotated by means of gearing 33, which is rotated by means of a spring in a casing 34, a key 35 extending beyond the camera for winding up the spring disposed in the casing 34. The film spool 30 is held against the spiral groove plate 29ª to rotate the latter by the resilient means 30ª.

When the plunger 24 has been moved as has been described to raise the dog 27 from one of the recesses 28, the dog 27 will be disposed in the spiral groove 29 beyond the recess 28, so that it will seat in the next recess 28, with the rotation of the spool 30, this movement of the dog 27 being permitted, since after the movement of the plunger 24 to the right, the lower arm 15 of the lever 11 will pass to the right of the arm 17, thereby permitting the return movement of the plunger 24 under the influence of the spring 36. The lever 26 is held yieldingly in position on the plunger 24 by a spring 37, by which means the dog 27 is pressed in the spiral groove 29 to become seated in a recess 28 with the rotation of the spool 30. However, the movement of the lever 26 to the left is limited by a member on the plunger 24, so that with the movement of the plunger 24 to the right, the lever 26 may be moved thereby, and by this means the dog 27 may be raised from a recess to travel in the spiral groove 29 and become seated in the next recess.

The recesses 28 are spaced apart in the spiral groove 29 so that another section of the film may be presented for exposure with the rotation of the spool 30 a distance corresponding with the distance between two of the recesses 28. As a means of indicating how many exposures have been made, the lever 26 has a bent terminal 38 which is disposed in a slot 39 in an arm of a lever 40 pivoted on a pin 41, this lever 40 having a pointer 42 which travels relatively to a scale 43, the downward movement of the dog 27 moving the lever 26 so that it will operate the lever 40 to move the pointer 42 to a position relatively to the scale 43 for indicating the number of exposures. Secured to the lever 26 there is an arm 44 which may be used to move the lever to a position where the dog 27 will be freed from the recess 28 in which it may be disposed.

Having thus described our invention, we claim as new and desire to secure by Letters Patent:

1. In combination with a camera having shutter operating mechanism, a film carrier, means for operating the film carrier, a pivoted arm, resilient means for holding the pivoted arm in a predetermined position, the first means being positioned to operate on the movement of the arm in one direction, and a member for moving with the shutter operating mechanism and disposed for moving past the pivoted arm in the opposite direction with the forward movement of the shutter operating mechanism, the return movement of the shutter operating mechanism serving to move the pivoted arm a predetermined distance in the first direction before the member passes the arm.

2. In combination with a camera having shutter operating mechanism, a film carrier, means for operating the film carrier, a trip movable relatively to the body of the camera, positioned to operate the said means upon the movement of the trip in one direction, and a member for moving with the shutter operating mechanism and disposed for moving past the trip in the opposite direction with the forward movement of the shutter operating mechanism, the return movement of the shutter operating mechanism serving to move the trip a predetermined distance in the first direction before the member passes the trip.

3. In combination with a camera having shutter operating means, a film carrier having operating means, a plunger, resilient means for holding the plunger yieldingly in a predetermined position, means by which the plunger is adapted to control the operation of the film carrier, a pivoted arm, resilient means for holding the pivoted arm in a predetermined position, means by which the pivoted arm is adapted to operate the plunger upon the movement of the arm in one direction, and a member for moving with the shutter operating mechanism and disposed for moving past the pivoted arm in the opposite direction on the forward movement of the shutter operating mechanism, the return movement of the shutter operating mechanism serving to move the pivoted arm a predetermined distance in the first direction before the member passes the arm.

4. In combination with a camera having shutter operating mechanism, a member disposed for moving with the shutter operating mechanism, a film carrier having operating means, a plunger, resilient means for holding the plunger yieldingly in a predetermined position, means by which the plunger is adapted to control the operation of the film carrier, an arm movable relatively to the camera and adapted to be moved by the member upon its return movement after an exposure, and means by which the arm is adapted to operate the plunger.

5. In combination with a camera having a shutter-operating mechanism, a member disposed for moving with the shutter-operating mechanism, a film-carrier having operating means, a plunger, means by which the plunger is adapted to control the operation of the film-carrier, and means by which the member is adapted to operate the plunger.

6. In combination with a camera having shutter-operating mechanism, a member disposed for moving with the shutter-operating mechanism, a film-carrier having operating means, a plunger, means by which the plunger is adapted to control the operation of the film-carrier, an arm movable relatively to the camera and adapted to be moved by the member on its return movement after an exposure, and means by which the arm is adapted to operate the plunger.

7. In combination with a camera having shutter-operating mechanism, a film-carrier having operating means, a plunger, means by which the plunger is adapted to control the operation of the film-carrier, a pivoted arm, resilient means for holding the pivoted arm in a predetermined position, means by which the pivoted arm is adapted to operate the plunger on the movement of the arm in one direction, and a member for moving with the shutter-operating mechanism and disposed for moving past the pivoted arm in the opposite direction with the forward movement of the shutter-operating mechanism, the return movement of the shutter-operating mechanism serving to move the pivoted arm a predetermined distance in the first direction before the member passes the arm.

8. In combination with a camera having shutter-operating mechanism, a film-carrier having operating means, a pivoted arm, resilient means for holding the pivoted arm in a predetermined position, a member for moving with the shutter-operating mechanism and disposed for moving past the pivoted arm in one direction with the forward movement of the shutter-operating mechanism, the return movement of the shutter-operating mechanism and the member serving to move the pivoted arm a predetermined distance in the opposite direction before the member passes the arm, and means by which the movement of the pivoted arm in the last mentioned direction is adapted to control the operation of the film-carrier.

9. In combination with a camera having shutter-operating mechanism, a film-carrier having operating means, a pivoted arm, resilient means for holding the pivoted arm in a predetermined position, a lever having an arm disposed for moving with the shutter-operating mechanism and with its other arm disposed for moving past the pivoted arm in one direction with the forward movement of the shutter-operating mechanism, the return movement of the shutter-operating mechanism and the lever serving to move the pivoted arm a predetermined distance in the opposite direction before the lever passes the arm, and means by which the lever is adapted to control the operation of the film-carrier.

10. In a camera, a film carrier having a rotatable member with a spiral groove, there being recesses spaced apart in the spiral groove, a lever having a dog and a pin, the dog being disposed for moving in the groove and being adapted to move into the recesses, and a pivoted pointer for indicating the recess in which the dog may be disposed, and provided with a slot in which the pin is disposed.

11. In a camera, a film carrier having a rotatable member with a spiral groove, there being recesses spaced apart in the spiral groove, a lever having a dog and a pin, the dog being disposed for moving in the groove and being adapted to move into the recesses, a pivoted pointer for indicating the recess in which the dog may be disposed, and provided with a slot in which the pin is disposed, a resilient means for holding the lever with the dog pressing against the rotatable member in its spiral groove, and means for moving the lever to free the dog from a recess.

12. In combination with a camera having a shutter-operating plunger, a film-carrier having operating means and a rotatable member with a spiral groove, there being recesses spaced apart in the spiral groove, a dog for traveling in the spiral groove and adapted to enter the recesses, a second plunger on which the dog is mounted, resilient means for holding the second plunger in one direction with the dog in the groove so that it will enter the next recess with the rotation of the rotatable member, a pivoted arm, resilient means for holding the pivoted arm in a predetermined position, means by which the pivoted arm is adapted to operate the second mentioned plunger on the movement of the arm in one direction, and a member for moving with the shutter-operating plunger and disposed for moving past the pivoted arm in the opposite direction with the forward movement of the shutter-operating plunger, the return movement of the shutter-operating plunger and the member serving to move the pivoted arm a predetermined distance in the first mentioned direction for operating the second mentioned plunger before the member passes the arm.

13. In combination with a camera having a shutter-operating plunger, a film-carrier having operating means and a rotatable member with a spiral groove, there being recesses spaced apart in the spiral groove, a dog for traveling in the spiral groove and adapted to enter the recesses, a second plunger on which the dog is mounted, resilient means for holding the second mentioned plunger yieldingly in one direction with the dog in the groove so that it will enter the next recess with the rotation of the rotatable member, a rock shaft, an arm mounted on the rock shaft, resilient means for holding the rock shaft and the arm yieldingly in a predetermined position, another arm secured to the rock shaft for operating the second mentioned plunger by engagement therewith, and a member for moving with the first plunger and disposed for moving past the first arm in one direction with the forward movement of the shutter-operating plunger, the return movement of the shutter-operating plunger and the member serving to move the first mentioned arm a predetermined distance in the other direction to rock the shaft before the member passes the first mentioned arm.

14. In combination with a camera having shutter operating mechanism, a spring operated film carrier having a rotatable member with a spiral groove at its end, there being recesses spaced apart in the spiral groove, a dog for traveling in the spiral groove and adapted to enter the recesses one at a time, resilient means for pressing the dog in the spiral groove so that it will enter the next recess with the rotation of the rotatable member, means disposed for moving with the closing of the shutter operating mechanism for operating the resilient means to raise the dog from a recess and permit the operation of the film carrier.

WILLIAM DORWARD BLAIR.
WILLIAM JOHN WRIGHT.

Copies of this patent may be obtained for five cents each, by addressing the "Commissioner of Patents, Washington, D. C."